July 17, 1962  J. WRIGHT  3,044,519
PNEUMATIC TYRES
Filed March 31, 1961

Inventor:
Joseph Wright
by Benj. T. Rauber
his attorney

United States Patent Office 3,044,519
Patented July 17, 1962

3,044,519
PNEUMATIC TYRES
Joseph Wright, Meriden, near Coventry, England, assignor to Dunlop Rubber Company Limited, London, England, a British company
Filed Mar. 31, 1961, Ser. No. 99,821
Claims priority, application Great Britain Apr. 13, 1960
4 Claims. (Cl. 152—187)

This invention relates to pneumatic tyres, and more particularly to pneumatic tyres of the type comprising a rigid tread reinforcement. The invention is particularly applicable to tyres of the type having a tread band detachably mounted in a groove on the outer periphery of a tyre carcass and secured therein by the effect of the tyre inflation pressure acting against a constricting tension set up in the tread band.

In order to render the tread band substantially inextensible it is provided with a layer of substantially inextensible metallic cords, said cords being disposed parallel to the mid-circumferential line of the tread band. A second layer of said cords may also be provided, the cords of the second layer usually being disposed at 90° to said mid-circumferential line.

Owing to the proximity of the ends of the cords of the second layer to the lateral edges of the tread band there is a tendency for looseness to develop between the cord ends and the surrounding rubber in use of the tyre, when high stresses are set up in the lateral edge regions of the band.

The present invention provides a pneumatic tyre having an improved tread reinforcement which is less liable to develop cord looseness at its lateral edges than known types of reinforcement.

According to the invention a pneumatic tyre comprises a tread reinforcement having a layer of substantially inextensible metallic reinforcing cords extending across the tread from one side thereof to the other, the lateral edges of the layer projecting beyond the rubber of the tread at each side thereof, and the said edges being embedded in and surrounded by rubber of substantially softer composition than the tread rubber composition moulded integrally with the tread rubber.

In a preferred construction, a detachable tread band for a pneumatic tyre comprises a layer of substantially inextensible metallic reinforcing cords, said cords being disposed parallel to the mid-circumferential plane of the band, and a second layer of said cords, the cords of the second layer extending across the band from one side thereof to the other, the lateral edges of said second layer projecting beyond the rubber of the tread band at each side thereof, and the said edges being embedded in and surrounded by rubber of substantially softer composition than the tread rubber composition moulded integrally with the tread rubber.

Preferably also, the soft rubber composition surrounding each of the lateral edges of the second layer is moulded in the form of a circumferential axially-extending rib.

In an alternative construction, a conventional pneumatic tyre, i.e. one having an integrally formed tread, has a tread reinforcement comprising a layer of substantially inextensible reinforcing cords extending across the tread with the lateral edges of the layer projecting beyond the rubber at each side of the tread.

Embodiments of the invention will now be described, by way of example, with reference to the accompanying drawings in which.

Figure 1:
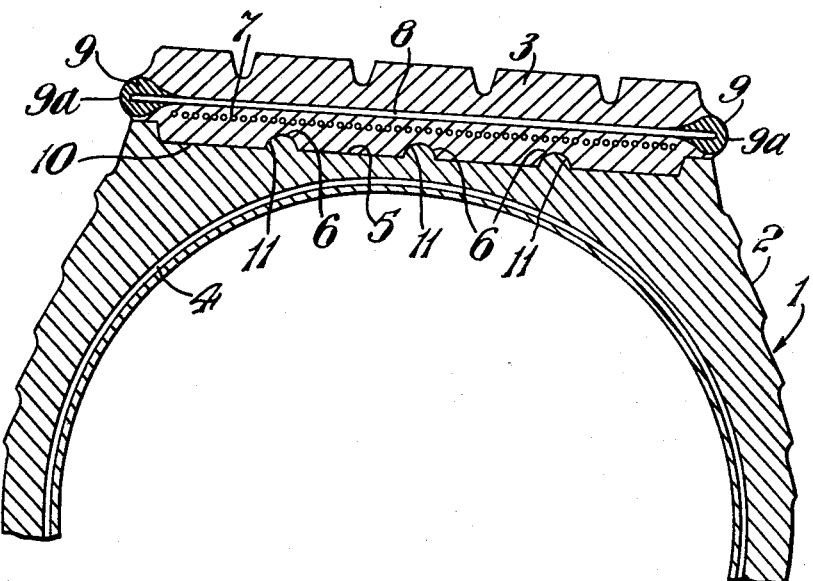
FIGURE 1 is a transverse cross-section of part of a pneumatic tyre showing one embodiment of the invention.

As shown in FIGURE 1, a pneumatic tyre 1 comprises a tyre carcass 2 and a detachable tread band 3.

The carcass 2 is provided with a steel cord reinforcement 4 the cords of which are disposed at 90° to the mid-circumferential plane of the carcass, and it is also provided on its outer peripheral surface with a circumferential groove 5 for engagement with the detachable tread band. The groove 5 is provided with three circumferentially extending ribs 6 which assist in gripping the band 3.

The tread band 3 comprises a tread reinforcement 7 of rubberised parallel steel cords, the cords of which extend around the tread band parallel to the mid-circumferential plane of the tread band. In addition to this, the tread band 3 is provided with a second reinforcement 8, which is disposed radially outwardly from the first reinforcement 7 of the tread band. The second reinforcement comprises a layer of rubberised steel cord fabric the cords of which are parallel to one another and extend across the tread band from one side to the other at an angle of 90° to the said plane, the lateral edges of the layer extending beyond the rubber at each side of the tread band by approximately .5 inch. A strip of rubber 9 is provided ta each edge of the reinforcement layer 8, the rubber of each strip being of softer composition than the surrounding rubber of the tread band. Each strip 9 is U-shaped in cross-section and is disposed in contact with the associated edge of the reinforcement layer 8, with the two limbs of the strip extending one on either side of the reinforcement layer 8 so that the strip of rubber projects axially outwardly from the tread rubber in the form of a circumferentially extending rib 9a. The inner circumferential surface 10 of the tread band 3 is shaped complementary to the groove 5 provided in the tyre carcass 2, three circumferentially extending grooves 11 being provided in the surface 10 to register with the ribs 6 upon assembly of the tread band upon the tyre carcass.

The method of manufacturing the tyre 1 will now be described.

The tyre carcass 2 is constructed in the usual manner, that is by assembling it in a substantially cylindrical condition upon a collapsible tyre building former and then expanding it into a toroidal shape within a tyre mould in which it is vulcanised. The mould in this case, however, is provided with a mould surface to provide the carass 2 with the groove 5 and ribs 6 instead of the conventional tread pattern.

The detachable tread band 3 is built up as follows:

A layer of unvulcanised rubber to form the radially inner portion of the band is built on a collapsible cylindrical former of diameter slightly less than the inflated daimeter of the tyre carcass, and turns of rubberised steel cord, for the reinforcement 7, are wound helically and side-by-side around the periphery of the rubber to form a continuous layer, the cords being disposed parallel to the mid-circumferential plane of the layer as has already been described.

The strip of fabric for the second reinforcement 8 is now superimposed symmetrically on the layers already on the former. Before application of the reinforcement 8 to the former, the strips of rubber 9 are applied to the edges of the reinforcement layer each in its position with respect to the reinforcement as described above so as to enclose and embed the lateral edges of the reinforcement layer.

The tread rubber is now superimposed symmetrically on the second layer, the assembly is removed from the former and vulcanised in a mould to form a tread band with a pattern on the outer peripheral surface of the tread and a shape on the inner surface 10 complementary to the groove 5 of the carcass 2. The mould also forms the U-shaped rubber strips 9 into laterally extending ribs surrounding the cord ends of the second layer and bonded firmly to the tread rubber.

The moulded carcass 2 and the tread band 3 may be fitted together by compressing the carcass radially and springing it into the tread band. The tyre may then be mounted on a wheel rim and inflated, the inflation pressure serving to hold the tread band securely to the carcass. This condition is shown in FIGURE 1.

In use, the soft rubber ribs 9a do not transmit the high stresses set up in the tread shoulders to the cord ends of the reinforcement layer 8, and thus these ends do not tend to become detached from the surrounding rubber.

Figure 2:
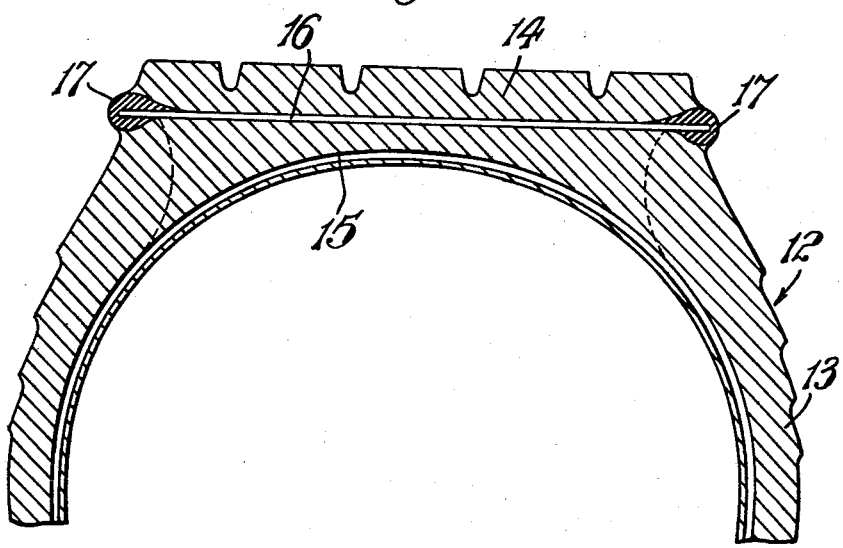
FIGURE 2 is a view similar to FIGURE 1 showing a second embodiment of the invention.

A second embodiment of the invention will now be described:

A tyre 12, as shown in FIGURE 2, is provided with an integrally formed tyre carcass 13 and tread 14. The tyre carcass 13 is provided with a steel cord reinforcement 15 of a construction similar to that of the reinforcement 4 described in the first embodiment.

The tread 14 of the tyre is provided with a tread reinforcement 16 comprising a layer of rubberised parallel steel cord fabric the construction of which is similar to that of the layer 8 of the first embodiment. The cords of the reinforcement extend across the tread region at 90° to the mid-circumferential plane of the tyre with the lateral edges of the reinforcement extending beyond the tread rubber. A strip of soft rubber 17 is provided at each edge of the layer 16 and is disposed in a similar manner upon the tyre as are the strips 9 described in the first embodiment.

To construct the tyre 12 the carcass is built in cylindrical form upon a collapsible tyre building former, the layer 16 and tread 14 being added to it while the carcass is in a cylindrical state. The complete assembly is then expanded into toroidal shape within a mould, resulting in a tyre as shown in FIGURE 2.

While layers of cords for the reinforcement are described in the preceding embodiments extending at 0° and 90° with respect to the circumferential plane, other angular disposition of the cords are within the scope of the invention.

Having now described my invention—what I claim is:

1. A pneumatic tyre comprising a tread reinforcement having a layer of substantially inextensible metallic reinforcing cords extending across the tread from one side thereof to the other, the lateral edges of the layer projecting beyond the rubber of the tread at each side thereof, and the said edges being embedded in and surrounded by rubber of substantially softer composition than the tread rubber composition moulded integrally with the tread rubber.

2. A pneumatic tyre according to claim 1 provided with a detachable tread band into which the said tread reinforcement is incorporated.

3. A pneumatic tyre according to claim 1 wherein the reinforcing cords of the said tread reinforcement are disposed at an angle of 90° to the mid-circumferential plane of the tread.

4. A pneumatic tyre according to claim 1 wherein the soft rubber composition surrounding each of the lateral edges of the tread reinforcement is moulded into a circumferential rib extending axially outwardly from the rubber of the tread.

References Cited in the file of this patent
UNITED STATES PATENTS

| | | |
|---|---|---|
| 1,875,517 | Steere | Sept. 6, 1932 |
| 2,874,742 | Lugli | Feb. 24, 1959 |